United States Patent
Miyahara et al.

(10) Patent No.: US 10,928,989 B2
(45) Date of Patent: Feb. 23, 2021

(54) SERVER AND TERMINAL

(71) Applicant: DWANGO Co., Ltd., Tokyo (JP)

(72) Inventors: Toshihisa Miyahara, Tokyo (JP); Osuke Noguchi, Tokyo (JP); Takayuki Omori, Tokyo (JP); Shohei Ootomo, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/142,119

(22) Filed: Sep. 26, 2018

(65) Prior Publication Data
US 2019/0102052 A1 Apr. 4, 2019

(30) Foreign Application Priority Data

Sep. 29, 2017 (JP) .............................. JP2017-189602

(51) Int. Cl.
*G06F 3/00* (2006.01)
*G06F 3/0483* (2013.01)
(Continued)

(52) U.S. Cl.
CPC ........ *G06F 3/0483* (2013.01); *G06F 3/04817* (2013.01); *G06F 16/958* (2019.01); *G06Q 30/0641* (2013.01)

(58) Field of Classification Search
CPC ... G06F 3/0483; G06F 3/04817; G06F 3/0482
See application file for complete search history.

(56) References Cited

U.S. PATENT DOCUMENTS 6,981,212 B1* 12/2005 Claussen ............... G06F 16/986
715/205
2003/0203342 A1* 10/2003 Bowers .................. G09B 19/00
434/118
(Continued)

FOREIGN PATENT DOCUMENTS

CN 103809857 A 5/2014
JP 2003-108532 A 4/2003
(Continued)

OTHER PUBLICATIONS

Decision to Grant of corresponding Japanese application No. JP2017-189602; 6 pgs.
(Continued)

*Primary Examiner* — Nicholas Augustine
(74) *Attorney, Agent, or Firm* — Maier & Maier, PLLC

(57) ABSTRACT

A server including a reception unit, a determination unit, a generation unit, and a transmission unit. The reception unit receives an acquisition request for a first page associated with a first channel that is one of a plurality of channels provided by a platform application from a terminal. The determination unit determines whether or not the acquisition request includes supplementary information indicating that a shortcut icon to the first page has been selected. The generation unit activates the platform application in a case where the acquisition request includes the supplementary information and generates a response to the acquisition request, the response including a command to perform screen transition to a second page associated with the first channel after the activation of the platform application.

8 Claims, 7 Drawing Sheets

(51) Int. Cl.
*G06Q 30/06* (2012.01)
*G06F 3/0481* (2013.01)
*G06F 16/958* (2019.01)
*G06F 3/01* (2006.01)

(56) References Cited

U.S. PATENT DOCUMENTS

| | | | | |
|---|---|---|---|---|
| 2009/0006201 | A1* | 1/2009 | Faseler, Jr. | G06Q 30/0277 705/14.73 |
| 2013/0268967 | A1 | 10/2013 | Kang et al. | |
| 2014/0245199 | A1* | 8/2014 | Belotti | G06F 9/44505 715/762 |
| 2014/0282630 | A1* | 9/2014 | Charles | G06F 9/45504 719/331 |
| 2015/0040104 | A1* | 2/2015 | Mall | G06F 9/44505 717/121 |
| 2015/0077326 | A1* | 3/2015 | Kramer | G06F 3/0325 345/156 |
| 2015/0295985 | A1* | 10/2015 | Selvaraj | G06F 9/44521 709/217 |
| 2015/0341752 | A1* | 11/2015 | Flynn | G06F 3/04817 455/456.3 |

FOREIGN PATENT DOCUMENTS

| | | |
|---|---|---|
| JP | 2013-030048 A | 2/2013 |
| JP | 2014-99147 A | 5/2014 |
| JP | 2014-225061 A | 12/2014 |
| JP | 2015-38715 A | 2/2015 |
| JP | 2015-125758 A | 7/2015 |
| JP | 2017-523534 A | 8/2017 |

OTHER PUBLICATIONS

"Niconicoch", [online], [Search Sep. 10, 2017], Internet <URL: http://info.nicovideo.jp/ch/niconico_ch_app/>, 14 pgs.
"CocoPPa", [online], [Search Sep. 10, 2017], Internet <URL: http://cocoppa.com/>, 2 pgs.
"Easy E-mail Checking by Iconifying Commands", NETORAN, The 3rd volume No. 3, KK New Akiba, Mar. 1, 2009, p. 53., 3 pgs.
Office Action dated Jul. 25, 2019, in corresponding Chinese Application No. 201811138731.7; 13 pages.
Third Office Action dated Apr. 14, 2020 in corresponding Chinese Application No. 201811138731.7; 15 pages.
Decision of Rejection dated Aug. 28, 2020 in corresponding Chinese Application No. 201811138731.7; 18 pages.
Notice of Reasons for Refusal dated Jul. 28, 2020 in corresponding Japanese Application 2018-074594; 6 pages.
Yuki Murata, "Standard Software Use with Freedom", Mac Fan vol. 23, No. 7, Japan, Mynavi Corporation, Jul. 1, 2015, pp. 148-155 (documents showing well-known arts).

* cited by examiner

SERVER AND TERMINAL

FIELD

The present invention relates to a platform application.

BACKGROUND

At present, application development for smartphones has been mainly and actively performed. In order to distribute the developed application, it is necessary to apply the developed application to a predetermined distributor (typically a provider of operating system (OS)) and pass examination. The examination of the application is performed in accordance with guidelines to check whether or not the application is reliable.

There are various types of applications, but for example, in order to provide channels (sites) through which many content creators transmit contents or in order to provide channels through which many electronic commerce (EC) business operators perform e-commerce, platform-like applications (hereinafter, referred to as "platform application") has been currently distributed (for example, refer to Non-Patent Literature 1), and new platform applications are expected to be developed and distributed in the future.

In general, after activation of the platform application, a smartphone performs screen transition to a predetermined top page or a last displayed page. When a user performs an input to select a channel of a desired content creator or EC business operator, the smartphone performs the screen transition to a page of the selected channel. Herein, finally, the user will be able to view contents created by the desired content creator and make online shopping at a shop of the desired EC business operator.

[Non-Patent Literature 1] "NICONICOCH", [online], [Search Sep. 10, 2017], Internet <URL: http://info.nicovideo.jp/ch/niconico_ch_app/>

[Non-Patent Literature 2] "CocoPPa", [online], [Search Sep. 10, 2017], Internet <URL: http://cocoppa.com/>

SUMMARY

A content creator or an EC business operator may desire to customize a platform application in order to enhance guidance of users to a channel thereof. Specifically, customization such as changing an initial screen after activation of the platform application to a page of its own channel instead of a top page of the platform, changing an icon of the platform application to an icon unique to the channel, and the like is assumed. However, at present, in order to distribute the platform application customized by the content creator or the EC business operator to users, similarly to other new applications, it is necessary to apply to a distribution company.

On the other hand, similarly to the content creator or the EC business operator, the user of the platform application may desire to customize the platform applications in order to make it easier to follow a favorite channel. A certain type of application (for example, refer to Non-Patent Literature 2) can make it appear as if changing the icon of an arbitrary application to another icon by using a custom uniform resource locator (URL) scheme. However, actually, the application cannot change the icon itself, but the application adds another shortcut icon to the home screen that is linked to the application corresponding to the icon. Therefore, even though the added shortcut icon is selected, the same behavior as in the case of selecting the original icon of the application, that is, the screen transition to the top page of the platform or the last displayed page in the case of the platform application occurs.

An object of the invention is to customize a platform application providing a plurality of channels for each channel.

According to a first aspect of the invention, there is provided a server including a reception unit, a determination unit, a generation unit, and a transmission unit. The reception unit receives an acquisition request for a first page associated with a first channel that is one of a plurality of channels provided by a platform application from a terminal. The determination unit determines whether or not the acquisition request includes supplementary information indicating that a shortcut icon to the first page has been selected. The generation unit activates the platform application in a case where the acquisition request includes the supplementary information and generates a response to the acquisition request, the response including a command to perform screen transition to a second page associated with the first channel after the activation of the platform application. The transmission unit transmits the response to the acquisition request to the terminal.

According to a second aspect of the invention, there is provided a terminal including an input unit, a control unit, a transmission unit, and a reception unit. The input unit receives a user input to select a shortcut icon to a first page associated with a first channel which is one of a plurality of channels provided by a platform application. The control unit generates an acquisition request for the first page including supplementary information indicating that the shortcut icon has been selected in accordance with the user input. The transmission unit transmits the acquisition request for the first page to a server. The reception unit activates the platform application and receives, from the server, a response to the acquisition request, the response including a command to perform screen transition to a second page associated with the first channel after the activation of the platform application. The control unit further activates the platform application in accordance with the command and performs the screen transition to the second page after the activation of the platform application.

According to the invention, it is possible to customize a platform application providing a plurality of channels for each channel.

DETAILED DESCRIPTION

Figure 1:
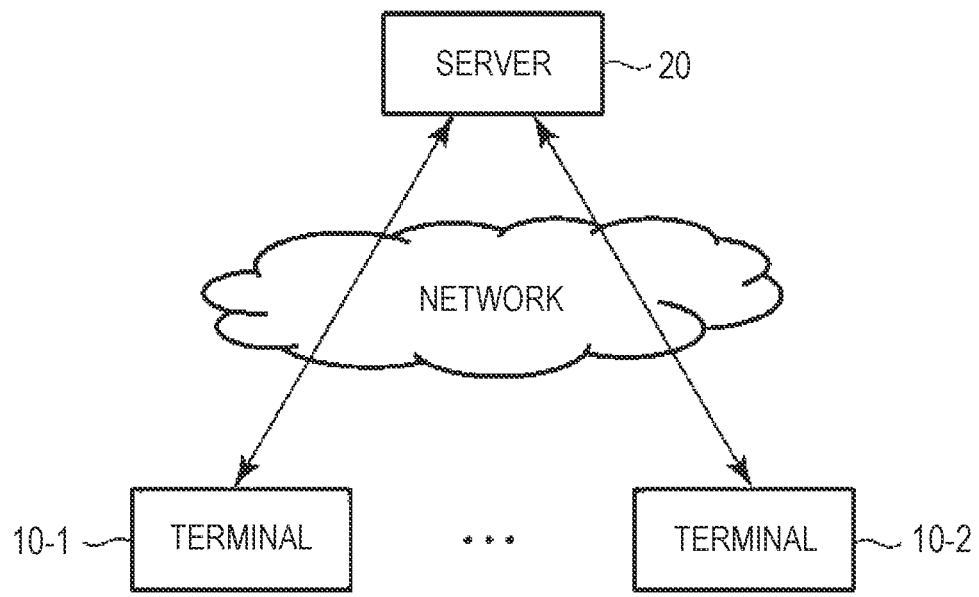
FIG. 1 is a block diagram illustrating a platform system according to an embodiment.

Embodiments will be described below with reference to the drawings. In addition, in the following description, elements that are same as or similar to the already described elements are denoted by the same or similar reference numerals, and redundant description thereof is basically omitted. For example, in a case where there are a plurality of the same or similar elements, common reference numerals may be used for description without distinguishing the respective element, and in order to distinguish and describe the respective element, branched reference numerals may be used.

A platform system according to an embodiment provides a platform service having a plurality of channels. The platform service, for example, can provide a channel through which a content creator transmits contents or provide a channel through which an EC business operator performs e-commerce. The terminal of the user can use the platform service by executing an Internet browser or a platform application to access a server.

As illustrated in FIG. 1, the platform system according to the embodiment includes terminals 10-1, 10-2, . . . , and a server 20. The terminals 10 in FIG. 1 are connected to the server 20 via a network and can transmit and receive data to and from each other. In addition, the total number of the terminals 10 is not limited to two, but the total number may be one or three or more. In addition, the server configuration illustrated in FIG. 1 is merely an example, and functions of one server may be shared by a plurality of apparatuses, and functions of a plurality of servers may be integrated in one apparatus.

The terminal 10 that can execute the platform application, for example, the terminal 10 where the application is installed can display a regular icon (hereinafter, referred to as a main icon) of the application on a screen thereof. If a user performs an input to select the main icon, the terminal 10 activates the platform application and, after that, typically generates an acquisition request for a top page (Web page) of the platform service and transmits the acquisition request to the server 20. The server 20 returns, to the terminal 10, page data corresponding to the received acquisition request as a response. The terminal 10 displays the received page data on the screen. If the user performs an additional input, the terminal 10 generates an acquisition request for an additional page in accordance with the user input and transmits the acquisition request to the server 20. By repeating such exchange, the terminal 10 can display a desired page of the channel of the content creator or the EC business operator from the top page of the platform service, and the user can receive contents or make online shopping via the first channel.

On the other hand, the terminal 10 according to the embodiment can add an icon (hereinafter, referred to as a sub icon) different from the regular icon to the screen as described later. The sub icon corresponds to a shortcut icon to a page (hereinafter, referred to as a first page) of one channel (hereinafter, referred to as a first channel) that can be provided by the server 20. Therefore, when the user performs an input to select the sub icon, the terminal 10 activates the Internet browser and, after that, generates an acquisition request for the first page and transmits the acquisition request to the server 20. The acquisition request includes the supplementary information indicating that the sub icon has been selected. The server 20 determines whether or not the received acquisition request includes the supplementary information. In the case that the acquisition request includes the supplementary information, the server returns a response different from that of a normal case to the terminal 10. Specifically, the response includes a command to activate the platform application and to perform screen transition to a page (second page) associated with the first channel after the activation of the application. The second page may be, for example, a top page of the first channel. The terminal 10 activates the platform application in accordance with the received command and performs the screen transition to the second page after the activation of the platform application. With such a configuration, the terminal 10 can display the second page of the first channel on the platform application without requiring any user input other than the selection of the sub icon, and the user can receive contents and make online shopping via the first channel.

Hereinafter, configurations and operations of the terminal 10 and the server 20 in FIG. 1 will be described sequentially with reference to the drawings.

The terminal 10 is, typically, a television receiver (including an Internet television), a personal computer (PC), a mobile terminal (for example, a tablet, a smartphone, a laptop, a feature phone, a portable game machine, a digital music player, an electronic book reader, and the like), a virtual reality (VR) terminal, and an augmented reality (AR) terminal, but the invention is not limited thereto.

The terminal 10 includes a processor which performs executing an application including an Internet browser and a platform application, controlling thereof, input/output controlling, generating various requests (data), controlling communication, and the like and a memory which temporarily stores a program to be executed by the processor and data used by the processor in order to realize the process.

Furthermore, the terminal 10 can use a communication device for connecting to a network, an output device for outputting video and/or sound of such as a Web page, an input device for receiving a user input, and an auxiliary storage device for storing the program and the data. These communication device, output device, input device and auxiliary storage device may be incorporated in the terminal 10 or may be externally attached to the terminal 10.

The communication device communicates with the server via the network. For example, the communication device transmits a page data acquisition request to the server 20 or receives a response to the acquisition request from the server 20.

The output device may include a display device for displaying a moving image, a still image, a text, and the like and/or a speaker for outputting sound, music, and the like. The display device is, for example, a liquid crystal display, an organic electroluminescence (EL) display, a cathode ray tube (CRT) display, or the like. The display device displays a display data including contents. In addition, the display device may have a function of the input device like a touch screen.

The input device may be, for example, a keyboard, a mouse, a ten-key pad, or the like or may have functions of a display device like a touch screen. The user input may typically be a tap, a click, a press of a particular key, and the like. Besides, the user input may be, for example, a user action (for example, swinging the terminal 10) estimated on the basis of sound picked up by a microphone, a biometric data (for example, body temperature, facial expression, and the like) detected by a biometric sensor, a position data identified by global positioning system (GPS) or a base station information, an acceleration data detected by an acceleration sensor, or the like.

The auxiliary storage device stores, for example, a program or a data relating to the application. The auxiliary storage device is preferably a nonvolatile storage medium such as a hard disk drive (HDD) or a solid state drive (SSD).

Figure 2:
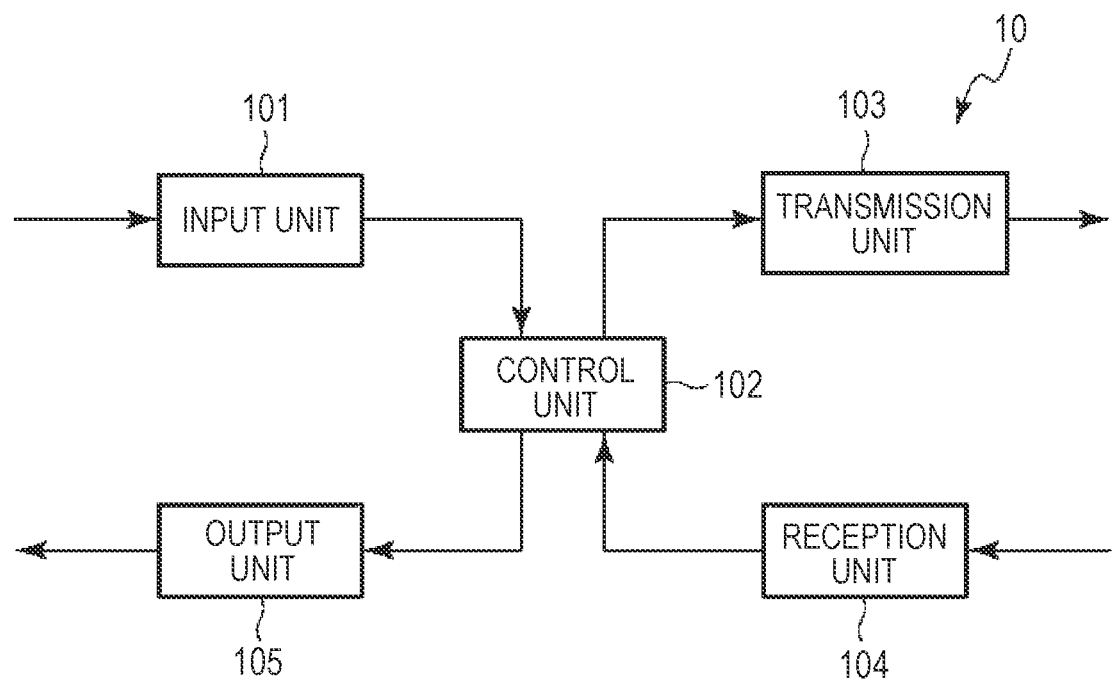
FIG. 2 is a block diagram illustrating a configuration example of a terminal in FIG. 1.

Next, the configuration example of the terminal 10 will be continued with reference to FIG. 2. The terminal 10 includes an input unit 101, a control unit 102, a transmission unit 103, a reception unit 104, and an output unit 105.

The input unit 101 receives a user input. The input unit 101 transmits the user input to the control unit 102. The input unit 101 may be the input device described above or may be an interface to the input device.

Specifically, the user input may include a user input to select a main icon or a sub icon, a user input to select a graphical user interface (GUI) component or a link on a screen displayed by the output unit 105, and the like.

The control unit 102 executes the application. The application includes both the Internet browser and the platform application. The control unit 102 operates on the basis of a user input from the input unit 101, a received data from the reception unit 104, and the like.

Upon receiving the user input to select the main icon from the input unit 101, the control unit 102 activates the platform application, generates an acquisition request for a default page, and transmits the acquisition request to the transmission unit 103. The default page may be, for example, a top page of the platform service or the last displayed page.

Upon receiving the user input to select the sub icon from the input unit 101, the control unit 102 activates the Internet browser and generates an acquisition request for the first page which is a shortcut destination of the sub icon. The acquisition request includes the supplementary information indicating that the sub icon is selected in addition to the URL of the first page. The control unit 102 transmits the acquisition request including the supplementary information to the transmission unit 103.

Upon receiving the response to the acquisition request from the reception unit 104 in a case where the main icon is selected, the control unit 102 transmits the page data corresponding to the default page included in the response to the output unit 105.

Upon receiving the response to the acquisition request from the reception unit 104 in a case where the sub icon is selected, the control unit 102 activates the platform application in accordance with the command included in the response and performs the screen transition to the second page after the activation of the application. That is, the control unit 102 transmits the page data corresponding to the second page to the output unit 105. The page data corresponding to the second page may be acquired by the control unit 102 transmitting an acquisition request after the activation of the application, or may be included in the same response as the command described above.

Incidentally, the response to the acquisition request in a case where the sub icon is selected may include a splash image that can be displayed on the screen for a standby time until the platform application on the terminal 10 is completely activated. In this case, the control unit 102 transmits the splash image to the output unit 105 and allows the splash image to be displayed on the screen.

The transmission unit 103 receives a request such as an acquisition request for a page from the control unit 102 and transmits the request to the server 20 via the network. The transmission unit 103 may be the communication device described above or may be an interface to the communication device.

The reception unit 104 receives the response to the request from the server 20 via the network. The reception unit 104 transmits the received response to the control unit 102. The reception unit 104 may be the communication device described above or may be an interface to the communication device.

The output unit 105 receives the page data (herein, data for displaying a Web page) from the control unit 102 and outputs the Web page. The output unit 105 may be the output device described above or may be an interface to the output device. In addition, the output unit 105 can also output a home screen. The home screen may include a main icon and/or a sub icon.

Figure 3:
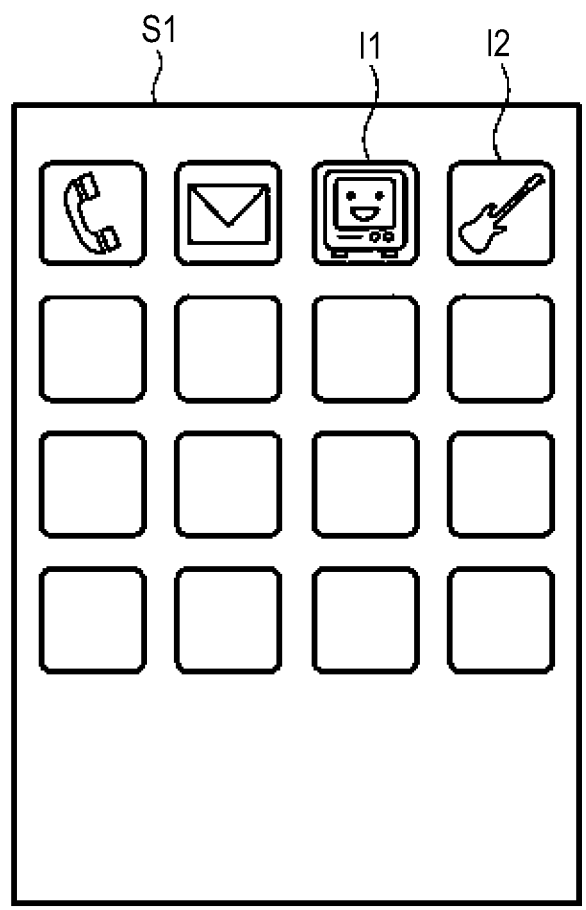
FIG. 3 is a diagram illustrating main icons and sub icons displayed on a screen of the terminal in FIG. 1.

The image or name of the sub icon may be different from the image or name of the main icon and may be set individually for each channel. In a screen S1 illustrated in FIG. 3, an image of a sub icon I2 is different from an image of a main icon I1. In this manner, it is possible to set a unique sub icon for each channel, so that it is possible to allow the sub icon I2 to look much like an icon of a channel-dedicated application. The image or name of the sub icon may be set by, for example, an operator of a channel (hereinafter, referred to simply as a channel associated with the sub icon) to which the page associated with the sub icon belongs.

Figure 4:
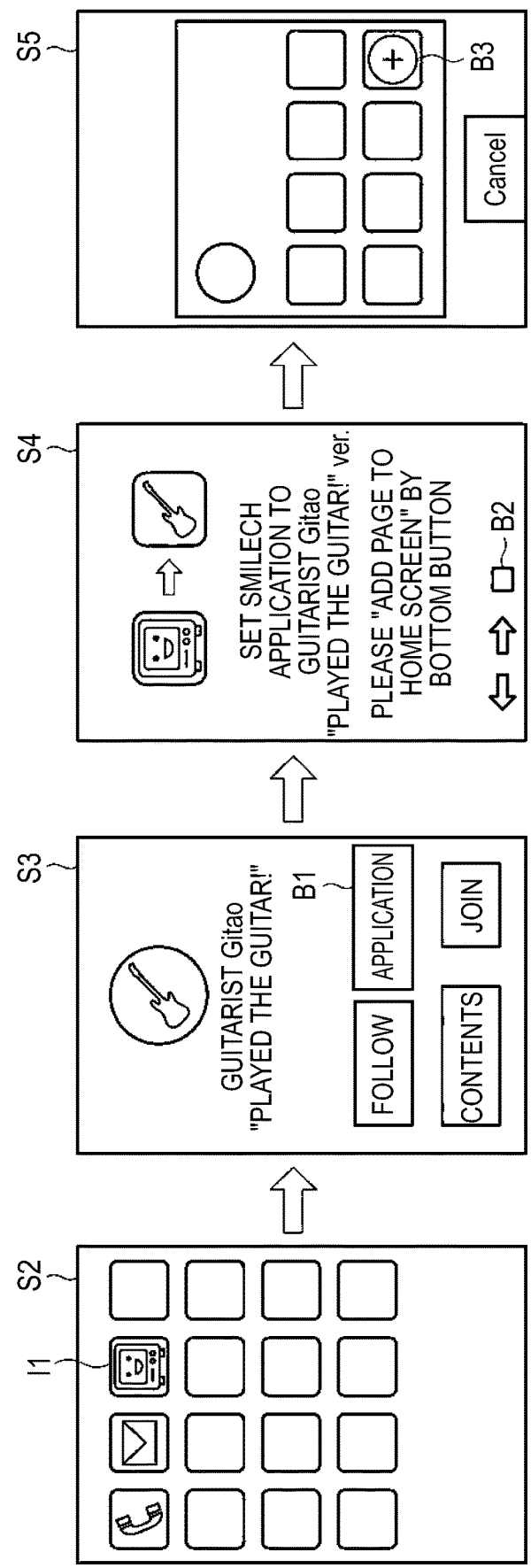
FIG. 4 is a diagram illustrating screen transition until a sub icon is added to a home screen of the terminal in FIG. 1.

The screen transition until the sub icon is added to the home screen is illustrated in FIG. 4. First, the user performs an input to select the main icon I1 of the platform application displayed on a home screen S2. As a result, the control unit 102 activates the platform application, and thus, a top page of the platform service is displayed on the screen of the terminal 10. After that, the user performs an additional input, and thus, a top page of a channel "Guitarist Gitao "Played the Guitar!"" which is a desired channel is allowed to be displayed on the screen of the terminal 10 (S3). Herein, the additional input may include, for example, selecting a channel category displayed on the screen, entering a keyword in a search bar, calling a registered favorite channel list, and the like.

In addition to a button for receiving contents, a button for following a channel, a button for joining as a paid member, and the like, in the top page of the channel "Guitarist Gitao "Played the Guitar!"", an "application" button B1 for adding a sub icon to the home screen is displayed. In addition, a button corresponding to the "application" button B1 may be displayed on a page other than the top page of the channel.

When the user performs an input to select the "application" button B1, the control unit 102 activates the Internet browser and acquires the page data corresponding to a page (hereinafter, simply referred to as an application setting page) indicated by a URL set to the "application" button. As a result, the application setting page is displayed on the screen of the terminal 10 (S4). The application setting page corresponds to an example of the first page described above. The application setting page may include a description of a procedure for adding the sub icon I2 to the home screen of the terminal 10.

Herein, when the user performs an input to select a button B2, the control unit 102 calls a launcher for using a standard function of the Internet browser being executed (S5). Furthermore, when the user performs an input to select a button B3 to use "add to the home screen" which is one of standard functions, the control unit 102 adds the sub icon I2 to the home screen (refer to, S1 in FIG. 3 and S6 in FIG. 5). The sub icon I2 corresponds to a shortcut icon to the application setting page of the channel "Guitarist Gitao "Played the Guitar!"".

Figure 5:
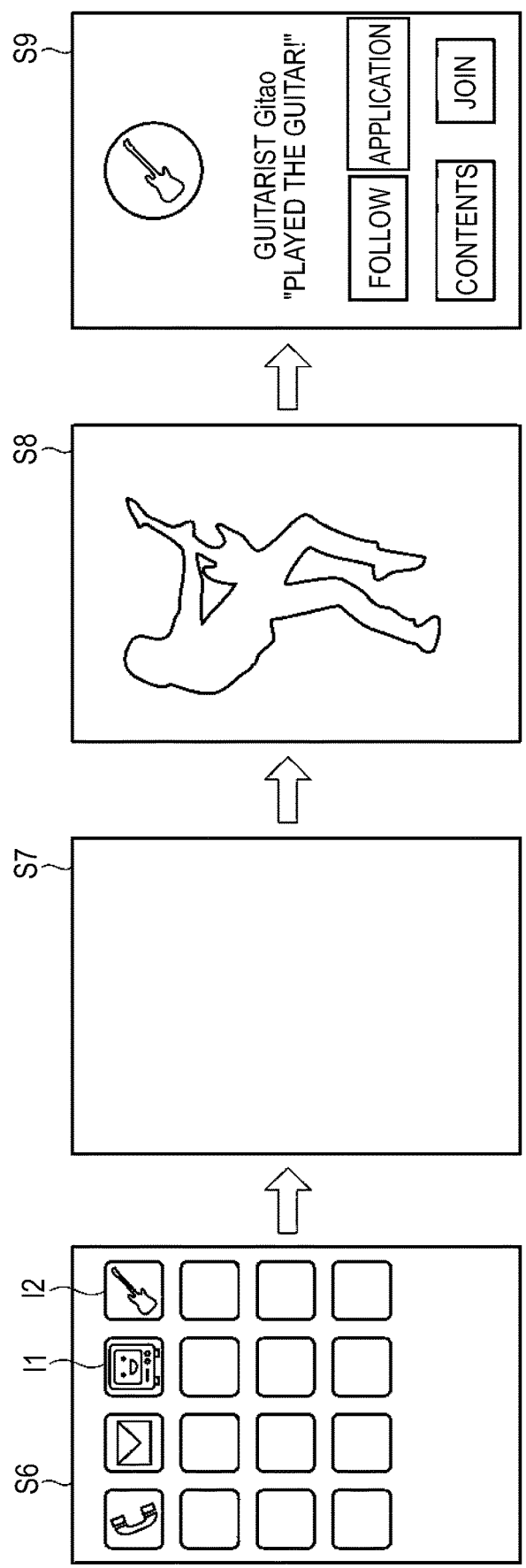
FIG. 5 is a diagram illustrating screen transition in a case where a sub icon in the home screen of the terminal in FIG. 1 is selected.

Subsequently, the screen transition in a case where the user selects the sub icon I2 added to the home screen in this manner is illustrated in FIG. 5.

First, the user performs an input to select the sub icon I2 of the platform application displayed on the home screen S6. As described above, the sub icon I2 corresponds to a shortcut icon to the application setting page of the channel "Guitarist Gitao "Played the Guitar!"". Therefore, the control unit 102 activates the Internet browser and generates an acquisition request for the application setting page. However, the acquisition request includes the supplementary information indicating that the sub icon I2 is selected. The transmission unit 103 transmits the acquisition request to the server 20.

Upon receiving the acquisition request including the supplementary information, the server 20 activates the platform application and transmits a response including a command to perform screen transition to a second page associated with the channel "Guitarist Gitao "Played the Guitar!"", for example, a top page of the channel after the activation of the application instead of the page data corresponding to an application setting page originally requested. Therefore, since the page data to be displayed is not provided to the Internet browser, a predetermined screen in, for example, all white or all black is temporarily displayed on the terminal 10 (S7).

As described above, the response from the server 20 may include the splash image that can be displayed on the screen for a standby time until the platform application on the terminal 10 is completely activated. In this case, the splash image is displayed on the screen of the terminal 10 (S8).

Herein, the splash image displayed after selecting the sub icon I2 may be different from the splash image displayed after selecting the main icon I1 or may be individually set for each channel. In this manner, it is possible to set a unique splash image for each channel, so that it is possible to allow the sub icon I2 to look much like an icon of a channel-dedicated application. The splash image may be set, for example, by the operator of the channel associated with the sub icon.

After the activation of the platform application, the control unit 102 automatically performs screen transition to the top page of the channel "Guitarist Gitao "Played the Guitar!"" (S9). The top page corresponds to the second page described above.

The terminal 10 and the server 20 are operated in this manner after the selection of the sub icon I2, so that the user is allowed to feel as if an application dedicated to a desired channel (in the example of FIG. 5, the channel "Guitarist Gitao "Played the Guitar!"") is installed in the terminal 10.

Next, an operation example of the terminal 10 will be described with reference to FIG. 6. The operation in FIG. 6 starts when the user selects a sub icon of the platform application displayed on the home screen of the terminal 10.

As described above, the sub icon of the platform application corresponds to a shortcut icon to a first page (for example, the application setting page) associated with a first channel that is one of a plurality of channels provided by the platform application. Therefore, the control unit 102 first activates the Internet browser (step S201).

Next, the control unit 102 generates an acquisition request for the first page including the URL of the first page and the supplementary information indicating that the sub icon is selected (step S202). The transmission unit 103 transmits the acquisition request generated in step S202 to the server 20 (step S203).

The reception unit 104 receives the response to the acquisition request transmitted in step S203 from the server 20 (step S204). The response includes a command to activate the platform application and to perform screen transition to a second page (for example, the top page of the first channel) associated with the first channel after the activation of the platform application instead of the page data corresponding to the first page. Furthermore, the response may include the splash image described above.

The control unit 102 activates the platform application in accordance with the command included in the response received in step S204 (step S205) and, after that, performs the screen transition to the second page (step S206). As a result, the output unit 105 can display the second page.

Figure 6:
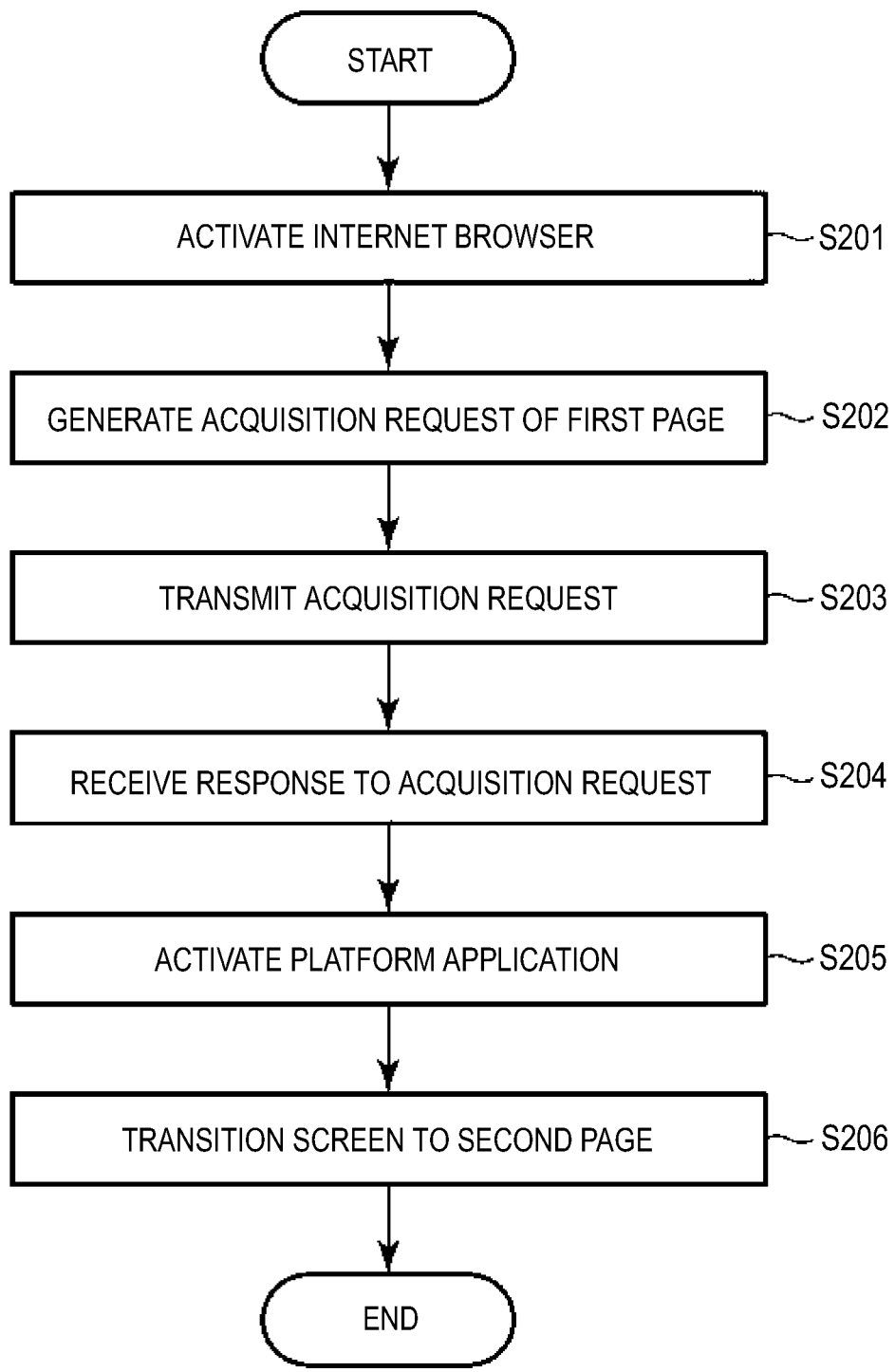
FIG. 6 is a flowchart illustrating an operation example of the terminal in FIG. 1.

According to the operation of FIG. 6, the user can jump directly to the page of the desired channel on the platform application not the Internet browser, merely by selecting the sub icon. Therefore, it is possible to allow the user to feel as if the application dedicated to the desired channel is installed in the terminal 10.

Next, a configuration example of the server 20 will be described. The server 20 is, for example, a (server) computer, and includes a processor to perform interpretation of an acquisition request received from the terminal 10 and generation of the response to the acquisition request, reading and writing the page data, user data to be described later, and the like, granting a privilege to be described later and the like, and a memory which temporarily stores a program to be executed by the processor and data used by the processor in order to realize the process.

The server 20 can further use a communication device for connecting to a network and an auxiliary storage device for storing a large amount of data. The communication device and the auxiliary storage device may be built in the server 20 or may be externally attached to the server 20.

The communication device communicates with the terminal 10 via the network. For example, the communication device receives the acquisition request from the terminal 10 or transmits the response to the acquisition request to the terminal 10.

The auxiliary storage device stores data such as the page data and the user data. The auxiliary storage device is preferably a nonvolatile storage medium such as an HDD or an SSD. The auxiliary storage device may be a file server connected to the server 20 via the network.

Figure 7:
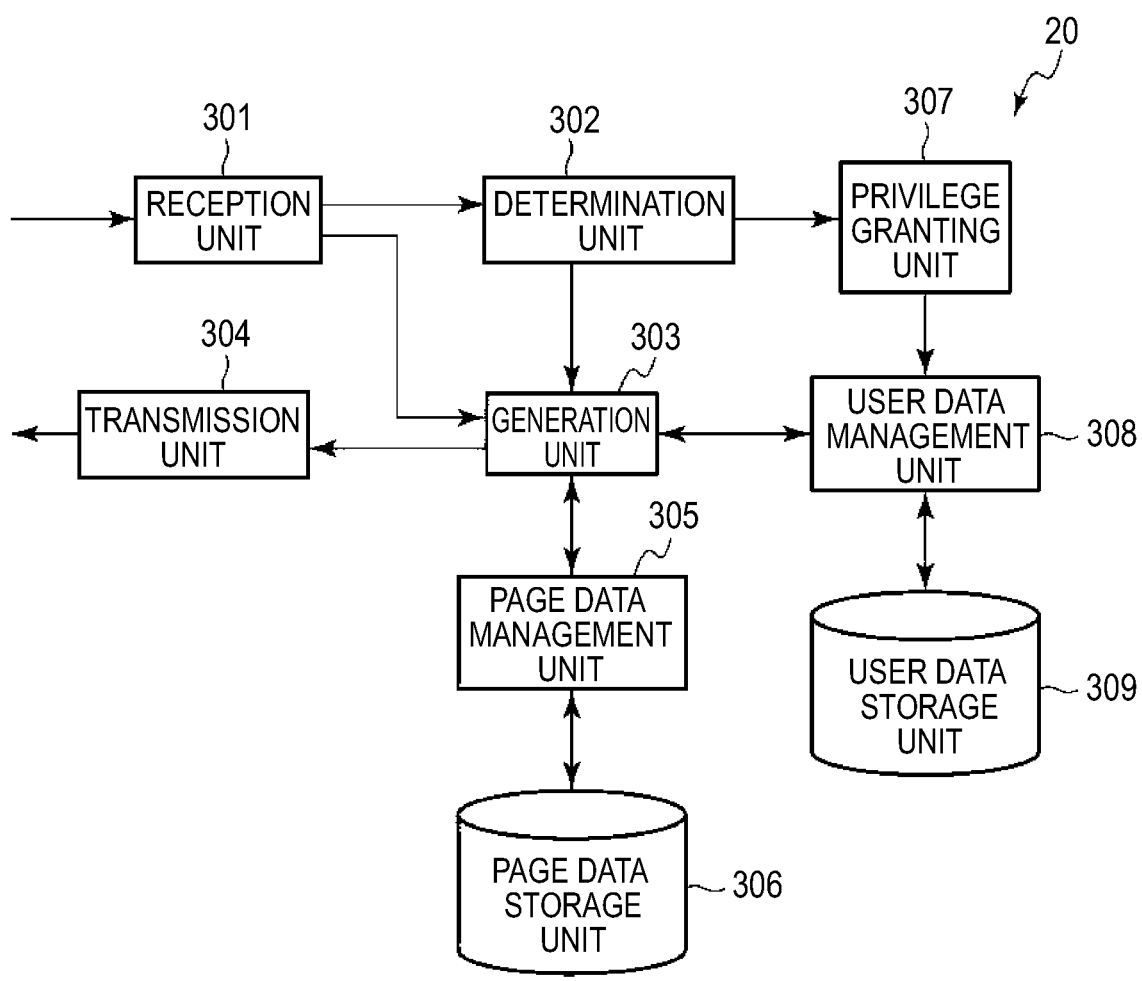
FIG. 7 is a block diagram illustrating a configuration example of a server in FIG. 1.

Next, the description of the configuration example of the server 20 will be continued with reference to FIG. 7. In FIG. 7, the server 20 includes a reception unit 301, a determination unit 302, a generation unit 303, a transmission unit 304, a page data management unit 305, a page data storage unit 306, a privilege granting unit 307, a user data management unit 308, and a user data storage unit 309.

The reception unit 301 receives an acquisition request for a page from the terminal 10 via the network. The reception unit 301 transmits the acquisition request to the determination unit 302 and the generation unit 303. The reception unit 301 may be the communication device described above or may be an interface to the communication device.

The determination unit 302 receives the acquisition request for the page from the reception unit 301. The determination unit 302 determines whether or not the acquisition request includes supplementary information indicating that the sub icon is selected. The determination unit 302 notifies the determination result to the generation unit 303 and the privilege granting unit 307. The determination unit 302 may be the processor and the memory described above.

The generation unit 303 receives the acquisition request for the page from the reception unit 301 and is notified of the determination result for the acquisition request by the determination unit 302. The generation unit 303 generates a response to the acquisition request by a different method depending on the notified determination result and transmits the response to the transmission unit 304. The generation unit 303 may be the processor and the memory described above.

In a case where the acquisition request does not include the supplementary information, the generation unit 303 requests the page data indicated by the URL included in the acquisition request to the page data management unit 305. The generation unit 303 receives the page data from the page data management unit 305. The generation unit 303 generates a response including the page data.

In a case where the acquisition request includes the supplementary information, the generation unit 303 activates the platform application by the terminal 10 and generates a response including a command to perform screen transition to a second page (for example, the top page of the channel) associated with the same channel as the first page which is the object of the acquisition request after the activation of the application. The generation unit 303 may allow the URL of the second page to be included in the response so that the terminal 10 can perform screen transition to the second page or may acquire the page data corresponding to the second page from the page data management unit 305 and allow the page data to be included in the response.

In addition, the generation unit 303 may specify the URL of the second page by refer to a table that associates the URL of the first page with the URL of the second page or by performing a predetermined character string calculation (removing, changing, adding, and the like of a predetermined character string) to the URL of the first page.

The transmission unit 304 receives the response from the generation unit 303, and transmits the response to the terminal 10 via the network. The transmission unit 304 may be the communication device described above or may be an interface to the communication device.

The page data management unit 305 manages the page data stored in the page data storage unit 306. For example, the page data management unit 305 reads the page data requested by the generation unit 303 from the page data storage unit 306 and returns the page data to the generation unit 303. The page data management unit 305 may be the processor and the memory described above.

The page data storage unit 306 stores the page data written by the page data management unit 305. The page data storage unit 306 may be the auxiliary storage device described above or may be an interface to the auxiliary storage device.

The privilege granting unit 307 is notified of the determination result for the acquisition request by the determination unit 302. In a case where the acquisition request includes the supplementary information, the privilege granting unit 307 conditionally or unconditionally grants a privilege to the user of the terminal 10 that transmits the acquisition request. It may be determined whether or not the condition is appropriate on the basis of, for example, profile data (for example, viewing histories, purchase histories, and the like) of the user, identification information (for example, URL, channel name, and the like) of the sub icon, the number of times of selection of the sub icon, date and time information or position information of the terminal 10 at the time when the sub icon is selected, or the like. The privilege granting unit 307 transmits information for identifying the user to whom the privilege is granted and the privilege to the user data management unit 308.

Granting a privilege itself is not essential to allow the sub icon to behave as if the application is an application dedicated to the channel. However, a mechanism for granting such a privilege is provided, so that the use of sub icon can be promoted. The privilege may be common among channels or may be set uniquely for each channel. In a case where the privilege can be set uniquely for each channel, for example, an operator of each channel can promote the use of the sub icon of its own channel by, for example, granting an incentive to the user who is a follower of the channel.

The privilege is basically a right to receive a commodity or service via a channel associated with a sub icon.

For example, in the case of a channel for transmitting a content, the privilege is a right to view a special content provided through the channel or a right to have a discount on a price for viewing a pay content provided through the channel or a price imposed on a member of the channel, and the like. The special content may be a content for which, for example, some condition is imposed for viewing.

In addition, in the case of a channel for performing e-commerce, the privilege may be a right to purchase a special product or service sold through the channel, a right to have a discount on a price of a product or service sold through the channel, a right to have a discount on a price for using a pay option accompanied with an electronic commerce performed via the channel, or the like. The special product or service may be a product or service for which, for example, some condition is imposed for purchase. The pay option may be, for example, wrapping, designation of a delivery date, designation of a delivery time, designation of a special delivery method, and the like.

The user data management unit 308 manages the user data stored in the user data storage unit 309, for example, the profile data of the user. For example, the user data management unit 308 may set a flag indicating that the privilege is granted to the user data of the user designated by the privilege granting unit 307. The user data management unit 308 may be the processor and the memory described above.

The user data storage unit 309 stores the user data written by the user data management unit 308. The user data storage unit 309 may be the auxiliary storage device described above or may be an interface to the auxiliary storage device.

Figure 8:
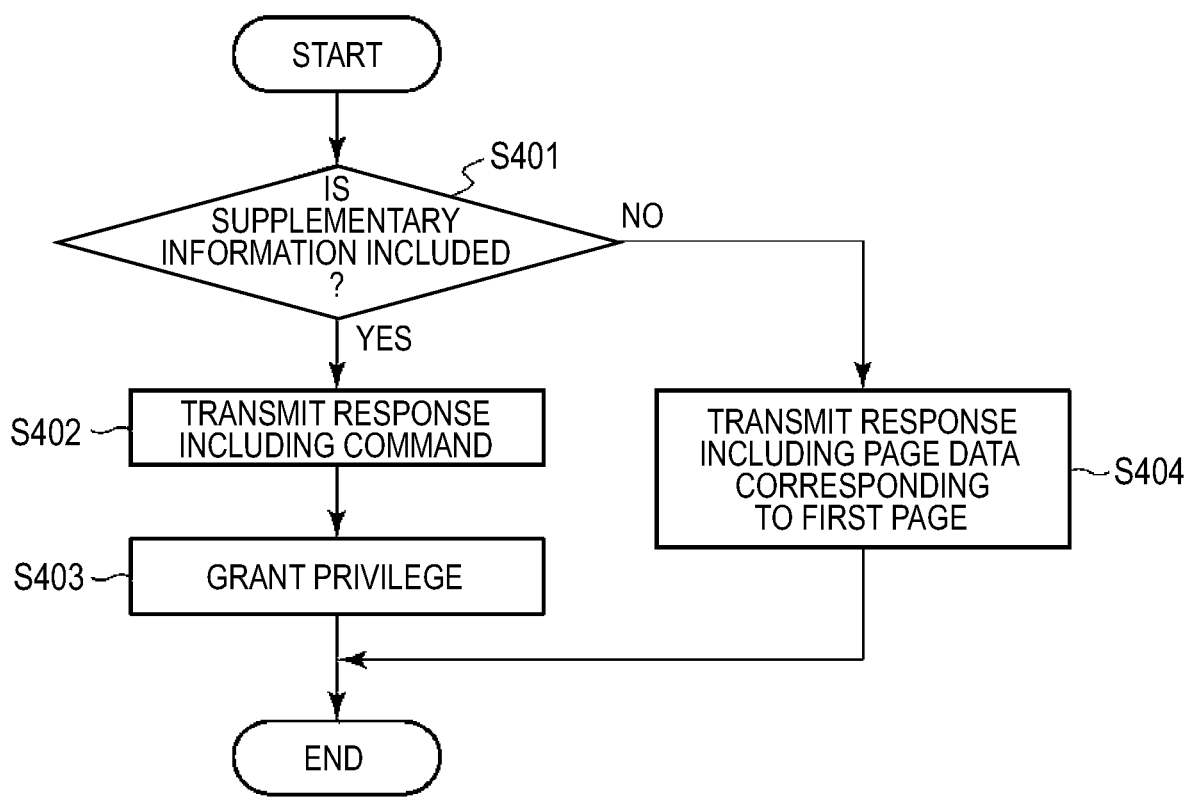
FIG. 8 is a flowchart illustrating an operation example of the server in FIG. 1.

Next, an operation example of the server 20 will be described with reference to FIG. 8. The operation in FIG. 8 starts when the server 20 receives an acquisition request for a page from the terminal 10.

The determination unit 302 determines whether or not the acquisition request for the page received by the reception unit 301 includes the supplementary information indicating that a sub icon is selected (step S401). If the acquisition request includes the supplementary information, the process proceeds to step S402, and if not, the process proceeds to step S404.

In step S402, the generation unit 303 generates a response including a command to allow the terminal 10 that transmits the acquisition request to activate the platform application and to perform screen transition to a second page associated with the same channel as that of the first page which is an object of the acquisition request after the activation of the platform application, and the transmission unit 304 transmits the response to the terminal 10. In addition, the privilege granting unit 307 may grant a privilege to the user of the terminal 10 conditionally or unconditionally (step S403).

On the other hand, in step S404, the generation unit 303 acquires the page data corresponding to the first page from the page data management unit 305 and generates a response including the page data, and the transmission unit 304 transmits the response to the terminal 10.

As described above, the server according to the embodiment determines whether or not the acquisition request for the page received from the terminal includes the supplementary information indicating that a sub icon (that is, a shortcut icon to the first page associated with the first channel provided by the platform application) is selected. Then, in a case where the acquisition request includes the supplementary information, the server generates a response to the acquisition request, including a command to allow the terminal to activate the platform application and to perform screen transition to a second page associated with a first channel after the activation of the application, and returns the response to the acquisition request to the terminal. Therefore, according to the terminal and the server, the sub icon which enables the terminal to activate the platform application and perform automatically screen transition to the page of the desired channel can be realized only by the user of the terminal performing selection manipulation such as tapping. That is, according to the terminal and the server, it is possible to customize the platform application for each channel.

The embodiments described above merely illustrate specific examples for the better understanding of the concept of the invention and are not intended to limit the scope of the invention. The embodiments can add, delete or change various components without departing from the spirit of the invention.

The various functional units described in the above embodiments may be realized by using circuits. The circuit may be a dedicated circuit for realizing a specific function or may be a general-purpose circuit such as a processor.

At least a portion of the processes of the embodiments described above can also be realized by using a general-purpose computer as basic hardware. The program for realizing the process described above may be provided by a computer readable recording medium storing the program. The program is stored in a recording medium as a file in an installable format or a file in an executable format. As the recording medium, there may be exemplified a magnetic disk, an optical disk (CD-ROM, CD-R, DVD, or the like), a magneto-optical disk (MO or the like), a semiconductor memory, and the like. The recording medium may be any one as long as the recording medium can store a program and can be read by a computer. In addition, the program realizing the processes described above may be stored on a computer (server) connected to a network such as the Internet and downloaded to a computer (client) via the network.

The invention claimed is:

1. A server comprising:
a reception unit configured to receive from a home screen of a terminal (1) an acquisition request generated from a selection from a main icon linked to a platform application displayed on and saved to the home screen of a terminal and (2) an acquisition request generated from a selection of a shortcut icon that is linked to a first page associated with one channel of a plurality of channels provided by the platform application, the shortcut icon being displayed on an internet browser of the home screen;
a determination unit that determines whether or not the acquisition request includes supplementary information indicating that a shortcut icon to the first page of the one channel provided by the platform application from the internet browser has been selected over the main shortcut icon of the platform application;
a generation unit that (1) activates the platform application and displays a top page of the platform application on the home screen of the terminal when the acquisition request is generated from the selection of the main icon, the top page of the platform application including an application button for adding a sub icon for the platform application, (2) activates the internet browser and acquires page data corresponding to an application setting page when the sub icon is selected, the application setting page including the sub icon and a button for a launcher for using a standard function of the internet browser (3) launches the standard function of the internet browser with the sub icon button when the button for a launcher for using a standard function of the internet browser is selected, (4) adds the shortcut icon to the application setting page when the sub icon button is selected,
wherein in a case where the acquisition request includes the supplementary information and generates a response to the acquisition request, the response including a command to automatically perform a screen transition on the home screen from the internet browser to a second page associated with the one channel of the platform application, the second page not being provided to the internet browser, a predetermined screen being temporarily displayed on the terminal until the platform application is completely activated, the screen transition being performed after the activation of the platform application without requiring an additional user input; and
a transmission unit that transmits the response to the acquisition request to the terminal.

2. The server according to claim 1,
wherein the response to the acquisition request includes a splash image that can be displayed on a screen of the terminal for a standby time until the platform application on the terminal is completely activated, and
wherein the splash image is individually set for each channel.

3. The server according to claim 1, wherein
an image or a name of the shortcut icon is individually set for each channel.

4. The server according to claim 1,
further comprising a privilege granting unit that grants a privilege to a user of the terminal in a case where the acquisition request includes the supplementary information.

5. The server according to claim 4, wherein
the privilege is a right to receive a commodity or a service via the one channel.

6. The server according to claim 4, wherein
the privilege includes at least one of a right to view a special content provided via the one channel and a right to have a discount on a price for viewing a pay content provided via the one channel or a price imposed on a member of the one channel.

7. The server according to claim 4, wherein
the privilege includes at least one of a right to purchase a special product or service sold through the one channel, a right to have a discount on a price of a product or service sold through the one channel, and a right to have a discount on a price for using a pay option accompanied with an electronic commerce performed via the one channel.

8. A terminal comprising:

an input unit configured to receive a user input from a home screen of the terminal of (1) a selection of a main icon linked to a platform application displayed and saved on the home screen and (2) a selection of a shortcut icon that is linked to a first page associated with one channel of a plurality of channels provided by the platform application, the shortcut icon being displayed on an internet browser of the home screen;

a control unit configured to generate an acquisition request for the first page, the acquisition request including supplementary information indicating that the shortcut icon on the internet browser of the home screen of the terminal has been selected over the main icon of the platform application of the home screen of the terminal in accordance with the user input;

a transmission unit that transmits the acquisition request for the first page to a server; and a reception unit that activates the platform application and receives, from the server, a response to the acquisition request, the response including a command to automatically perform a screen transition from the internet browser to a second page associated with the one channel after the activation of the platform application without requiring an additional user input, wherein the control unit (1) activates the platform application and displays a top page of the platform application on the home screen of the terminal when the acquisition request is generated from the selection of the main icon, the top page of the platform application including an application button for adding a sub icon for the platform application, (2) activates the internet browser and acquires page data corresponding to an application setting page when the sub icon is selected, the application setting page including the sub icon and a button for a launcher for using a standard function of the internet browser (3) launches the standard function of the internet browser with the sub icon button when the button for a launcher for using a standard function of the internet browser is selected, (4) adds the shortcut icon to the application setting page when the sub icon button is selected, and wherein the control unit further activates the platform application in accordance with the command and automatically performs the screen transition on the home screen from the internet browser to the second page, the second page not being provided to the internet browser, a predetermined screen being temporarily displayed on the terminal until the platform application is completely activated, the screen transition being performed after the activation of the platform application without requiring the additional user input.

* * * * *